June 17, 1952   P. T. ABRAMSON   2,600,720
TRUCK DOLLY AND JACK
Filed Aug. 25, 1950
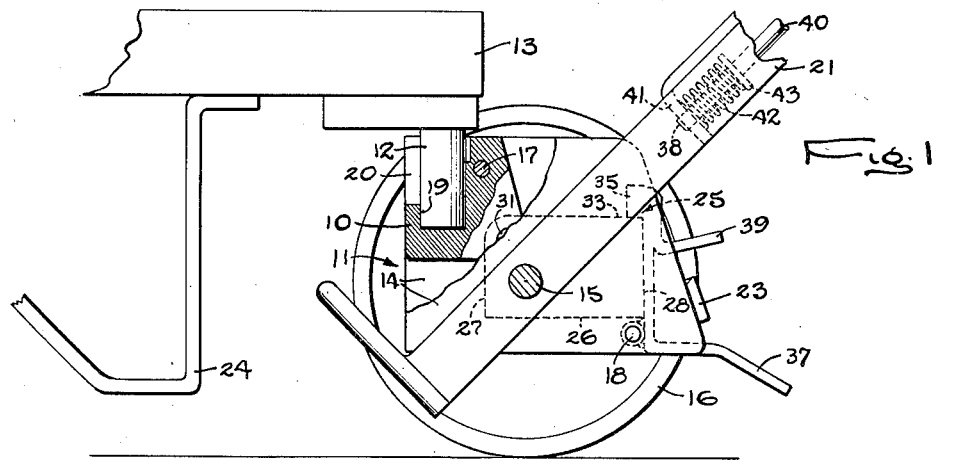
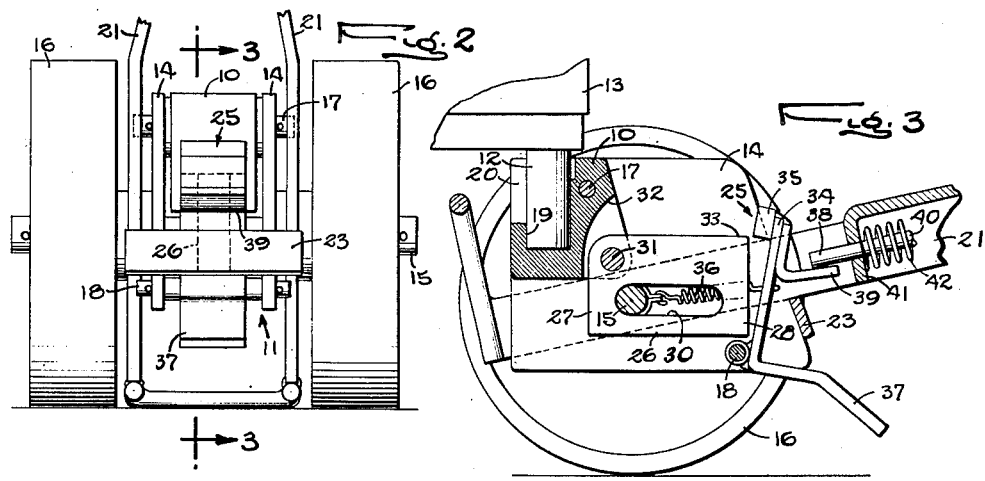
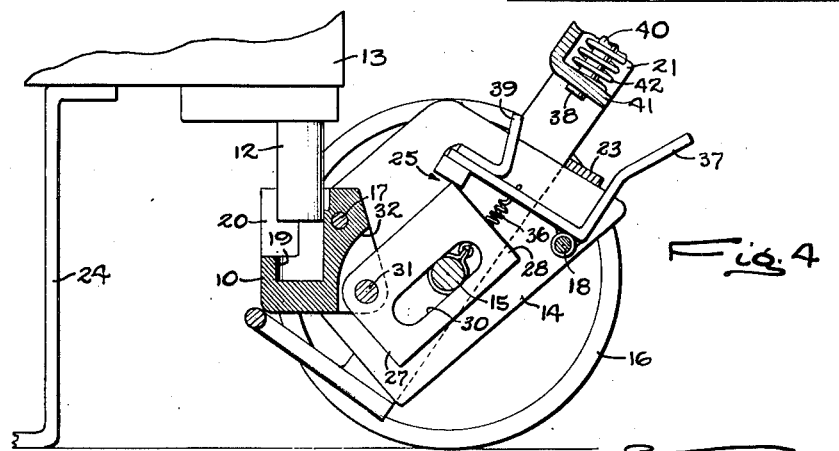
INVENTOR
Paul T. Abramson
By Cullen, Pitzner, Hubbard, Wolfe
ATTORNEY Patented June 17, 1952

2,600,720

UNITED STATES PATENT OFFICE 2,600,720

TRUCK DOLLY AND JACK

Paul T. Abramson, Rockford, Ill., assignor of one-third to Thomas H. Abramson and one-third to Carl A. Carlson, both of Rockford, Ill.

Application August 25, 1950, Serial No. 181,406

8 Claims. (Cl. 280—46)

This invention relates generally to material handling equipment of the truck and detachable dolly type and more particularly to a dolly of the type in which a coupling element pivoted on the dolly frame is locked to the latter by a latch after the wheelless end of the truck is jacked up by downward swinging of the operating handle.

The primary object of the invention is to provide a novel connection between the swingable coupling element and the latch so as to reduce the force which the latter must sustain in holding the coupling element locked to the dolly frame.

A more detailed object is to form the connection between the coupling element and the latch as a lever constructed and arranged relative to the frame in a novel manner to enable the latch to act at a substantial mechanical advantage.

The invention also resides in the novel and single construction of the dolly parts.

Other objects and advantages of the invention will become apparent from the following detailed description taken in connection with the accompanying drawings, in which Figure 1 is a fragmentary side elevational view of a truck dolly embodying the novel features of the present invention and coupled to a truck with some of the parts broken away and shown in section.

Fig. 2 is a fragmentary front elevational view of the dolly with the parts shown in different positions.

Fig. 3 is a sectional view taken along the line 3—3 of Fig. 2.

Fig. 4 is a view similar to Fig. 3 showing the parts in other different positions.

In the improved truck dolly or jack shown in the drawings, a coupling element or block 10 pivotally suspended from the frame 11 of the dolly is adapted to receive the coupling pin or post 12 which depends from the wheelless end of a truck 13. Herein, the frame includes a pair of generally rectangular parallel plates 14 journaled intermediate their ends on an axle 15 at points spaced along the latter between a pair of wheels 16 which are journaled on opposite ends of the axle. The plates are connected rigidly by pins 17 and 18 extending through alined holes in the plates and paralleling the axle on opposite sides thereof. The coupling block 10 is a casting having a vertically extending socket 19 therein open on one side as indicated at 20 to receive the truck pin 12 and pivotally suspended from the pin 17 above the socket and on the opposite side of the latter.

A handle 21 having bifurcated ends straddling the frame and pivoted on the axle 15 between the plates 14 and the wheels 16 engages the projecting ends of a bar 23 welded across the ends of the plates opposite the coupling block 10 and coacts with the plates to form a long lever by which the coupling block is swung upwardly on one side of the axle to engage the truck and elevate the latter onto the dolly wheels 16 when the lever is swung downwardly on the other side of the axle. After the truck has been elevated far enough for the skids or legs 24 thereof to clear the supporting surface as shown in Fig. 1, the coupling block is secured by a latch 25 against movement relative to the plates so as to form a rigid structure with the latter and prevent lowering of the truck.

In accordance with the present invention, the latch 25 is connected to the coupling block 10 in a novel manner to facilitate release of the latch and reduce the forces acting thereon in holding the truck 13 in its elevated position. This is accomplished by an elongated lever 26 which is pivotally connected at one end 27 to the coupling block and is fulcrumed intermediate its ends to pivot relative to the plates 14 thus converting the downward motion of the block under the weight of the truck on one side of the axle to an upward motion on the other side of the axle adjacent the handle 21 where the other or free end 28 of the lever is engaged and held by the latch against movement relative to the plates. To permit the socket 19 of the coupling block to remain in a vertical position at all times during swinging of the frame 11 about the axle, the lever is slidable along its fulcrum.

In the present instance, the lever 26 is a generally rectangular plate disposed between and parallel to the frame plates 14 and formed intermediate its ends with a slot 30 which extends longitudinally of the lever and slidably receives the axle 15 to form the pivotal and sliding connection between the lever and the parallel plates. The end 27 of the lever adjacent the coupling block is journaled on a pin 31 secured in the block below the pivot 17 therefor and extending parallel to the axle through a recess 32 which is formed in the lower end of the block and the side walls of which hold the lever centered along the axle between the plates. When the block is in its elevated position as shown in Figs. 1 and 3, the pivot pin 31 for the lever is located substantially on a line between the axle 15 and the coupling block pivot 17. The end portion of the lever 26 adjacent the block 10 forms a shorter lever arm than the free end portion of the lever on the opposite side of the axle.

In this instance, the latch 25 is engageable with an upwardly facing surface 33 on the end portion of the lever 26 adjacent the handle 21 and herein is an upstanding arm of a generally L-shaped member 34 pivoted intermediate its ends on the pivot pin 18 on the side of the axle 15 opposite the coupling block 10. A lug 35 on the free end of the latch is adapted to hook over and engage the upwardly facing surface 33 of the lever. The latch is yieldably urged toward the axle and into engagement with the lever by a coiled contractile spring 36 stretched between the axle 15 and an intermediate portion of the latch. The other leg 37 of the L-shaped member 34 projects downwardly and outwardly away from the frame 11 to form a pedal which is conveniently accessible on the handle side of the wheeled frame for depression by the operator's foot to swing the latch outwardly away from the axle and out of engagement with the lever.

Release of the latch 25 may also be effected as an incident to the downward swinging of the handle 21 through the provision of a projection 38 mounted on the handle between the forked ends thereof in an active position in which it engages a finger 39 on the side of the latch opposite the lug 35 to swing the latch about its pivot 18 and away from the lever 26. To enable the projection 38 to swing freely past the latch finger 39 when the handle is swung downwardly into engagement with the bar 23 the projection is formed as the inner end of a rod 40 slidable back and forth along the handle in a guide 41 thereon. A compression spring 42 surrounds the rod and bears at one end against the guide and at its opposite end against a shoulder 43 on the rod to urge the latter along the handle and outwardly away from the frame 11 as shown in Figs. 1 and 4.

Preparatory to coupling the dolly to the truck 13, the handle 21 is swung upwardly so as to lower the coupling block 10 which can then be pushed under the truck pin 12 as shown in Fig. 4. By virtue of the sliding connection between the lever 26 and the axle 15, the lever is free to shift back and forth with upward and downward movement of the coupling block which thereby stays in a vertical position. With the block thus lowered and as it is being raised by swinging the handle downwardly after the latter engages the bar 23 to coact with the frame 11 and form a long lever, the lug 35 on the latch 25 engages the end of the lever adjacent the handle as shown in Fig. 4 and is ineffectual to hold the lever against movement relative to the plates 14. When the truck has reached its elevated position shown in Fig. 1, the lever surface 33 has moved below the latch lug 35 to permit the latch to swing inwardly toward the axle under action of the spring 36 and hook over the lever. In this position, the latch prevents upward movement of the end 28 of the lever adjacent the handle to counteract the downward force of the weight of the truck on the coupling block 10 and thereby hold the latter and the lever against counterclockwise movement relative to the plates 14.

The latch 25 is released by swinging the handle 21 downwardly and moving the projection 38 along the handle and into engagement with the latch finger 39. At this time the forked ends of the handle are positioned adjacent and just above the projecting ends of the bar 23 so that, when the latch is tripped as shown in Fig. 3 by further downward movement of the handle, the latter engages the bar and cooperates with the plates to form a lever for lowering the truck slowly onto its supporting surface.

From the foregoing, it will be apparent that when the latch 25 is in holding engagement with the lever 26, the vertical line of the force acting on the end 27 of the lever adjacent the coupling block 10 is spaced much closer to the axle 15 than the vertical line of the force exerted by the latch on the other end 28 of the lever so that the latch acts at a substantial mechanical advantage. In addition to making this result possible, the lever also reverses the relative motion between the coupling block and the plates and thereby enables the latch to be arranged close to the handle and actuated in the downward movement of the latter. Most of the dolly parts including the plates 14, the lever 26, the latch 25, and the handle 21 may be made from sheet metal thereby simplifying the construction and reducing the cost of the dolly.

I claim as my invention:

1. In a truck dolly having a pair of wheels spaced along an axle, the combination of, a frame mounted on said axle between said wheels and movable relative to the latter about the axle, a coupling element adapted to receive the coupling pin of a truck and pivotally suspended from said frame on one side of said axle, a lever pivotally connected adjacent one end to said coupling element and extending from the latter across said axle with its other end portion disposed on the opposite side of the axle, said lever having a pivotal and sliding connection with said frame intermediate the lever ends, a latch pivoted on said frame on said opposite axle side and engageable with said other end portion to hold said lever and said element against movement relative to the frame, means yieldably urging said latch into engagement with said lever, a handle mounted on said axle and swingable about the latter relative to said frame on said opposite axle side, a member on said latch extending outwardly therefrom away from said axle, a projection on said handle movable relative to the latter into and out of an active position in which the projection is engageable with said latch member in the downward movement of the handle on said opposite axle side to move the latch away from said lever and release the latter and said element for movement relative to the frame, and means yieldably urging said projection away from said active position.

2. In a truck dolly having a pair of wheels spaced along an axle, the combination of, a pair of flat parallel plates stamped from sheet metal and spaced along and mounted on said axle between said wheels for movement relative to the latter about the axle, a pair of pins disposed parallel to said axle on opposite sides thereof and spanning said plates with opposite ends of the pins mounted in the plates, a coupling element adapted to receive the coupling pin of a truck and pivotally suspended from one of said pins between said plates, a lever in the form of a flat bar stamped from sheet metal and having a slot intermediate its ends slidably receiving said axle with one end of the lever pivoted on said element on said axle slide and its other end position disposed on the opposite side of the axle, a latch pivoted on the other one of said pins on said opposite axle side and engageable with said lever end portion to hold the lever and said element against movement relative to said plates, and means yieldably urging said latch into engagement with said lever.

3. In a truck dolly having a pair of wheels spaced along an axle, the combination of, a frame mounted on said axle between said wheels and movable relative to the latter about the axle, a coupling element adapted to receive the coupling pin of a truck and pivotally suspended from said frame on one side of said axle, a lever pivotally connected adjacent one end to said element on said axle side and extending across said axle with its other end portion disposed on the opposite side of the axle, said lever having a slot intermediate its ends slidably receiving said axle, a latch pivoted on said frame on said opposite axle side and engageable with said other lever end portion to prevent upward movement of the latter about the axle under the downward force of the weight of the truck exerted on said first lever end and thereby prevent movement of the coupling element relative to the frame, and means yieldably urging said latch into engagement with said lever.

4. In a truck dolly having a pair of wheels spaced along an axle, the combination of, a frame mounted on said axle between said wheels and movable relative to the latter about the axle, a coupling element adapted to receive the coupling pin of a truck and pivotally suspended from said frame on one side of said axle, a lever fulcrumed on and slidable along said axle intermediate the ends of the lever and having a short leg pivotally connected to said element on said axle side and a longer leg disposed on the opposite side of the axle, and a latch pivoted on said frame on said opposite axle side and engageable with said longer lever leg to hold the latter against upward movement about the axle under the downward force exerted by said truck on said shorter leg and thereby prevent movement of said element relative to said frame, and means yieldably urging said latch into engagement with said lever.

5. In a truck dolly of the character described, the combination of, a wheeled axle, a frame journaled thereon, a handle straddling said frame and pivoted thereon to swing downwardly into abutment with a part of the frame, a coupling element pivotally suspended from said frame on one side of said axle, a lever fulcrumed intermediate its ends on said axle and slidable endwise transversely of the axle, a pivot connecting said lever and said coupling element at a point spaced below the element pivot, a latch fulcrumed on said frame on the side of said axle opposite said element and swingable into and out of overlying engagement with the adjacent end portion of said lever.

6. In a truck dolly of the character described, the combination of, a wheeled axle, a frame journaled thereon, a coupling element pivotally suspended from said frame on one side of said axle, a lever fulcrumed intermediate its ends on said axle and slidable endwise transversely of the axle, means pivotally connecting said coupling element and the adjacent end of the lever, and a latch fulcrumed on said frame on the side of said axle opposite said element and swingable into and out of overlying engagement with the adjacent end portion of said lever.

7. In a truck dolly having a pair of wheels spaced along an axis, the combination of, a frame mounted on said axle between said wheels for movement relative to the latter about the axle, a coupling element adapted to receive the coupling pin of a truck and pivotally suspended from said frame on one side of said axle, a lever pivotally connected adjacent one end to said coupling element on said axle side and extending across said axle with its other end portion disposed on the opposite side of the axle, said lever having a pivotal and sliding connection with said frame intermediate the lever ends, a latch pivoted on said frame on said opposite axle side and engageable with said other end portion of said lever to hold the latter and said element against movement relative to the frame under the downward force of the weight of said truck on said first axle side, and means yieldably urging said latch into engagement with said lever.

8. In a truck dolly of the character described, the combination of, a wheeled frame providing spaced parallel pivots, a coupling element pivotally suspended from said frame and swingable about an axis extending parallel to and spaced from said pivots, a lever fulcrumed intermediate its ends on one of said pivots and pivotally connected adjacent one end to said coupling element at a point thereon below said axis to swing with the element about the axis, said lever having a slot slidably receiving the fulcrum therefor to permit movement of the lever along the latter in its swinging movement with said coupling element about said axis, and a latch swingable about the other one of said pivots and into overlying engagement with the other end portion of said lever.

PAUL T. ABRAMSON.

REFERENCES CITED

The following references are of record in the file of this patent:

UNITED STATES PATENTS

| Number | Name | Date |
| --- | --- | --- |
| 2,311,442 | Johnston | Feb. 16, 1943 |